US008381835B2

(12) United States Patent
Hosokawa

(10) Patent No.: US 8,381,835 B2
(45) Date of Patent: Feb. 26, 2013

(54) POWER TOOL

(75) Inventor: Nobuhito Hosokawa, Ibaraki (JP)

(73) Assignee: Hitachi Koki Co., Ltd., Tokyo (JP)

( * ) Notice: Subject to any disclaimer, the term of this patent is extended or adjusted under 35 U.S.C. 154(b) by 0 days.

(21) Appl. No.: 12/497,630

(22) Filed: Jul. 3, 2009

(65) Prior Publication Data

US 2010/0026107 A1 Feb. 4, 2010

(30) Foreign Application Priority Data

Jul. 30, 2008 (JP) ................................ 2008-196093

(51) Int. Cl.
*B23B 45/16* (2006.01)
*B25D 11/00* (2006.01)
*B25D 13/00* (2006.01)

(52) U.S. Cl. ........... 173/217; 173/205; 173/213; 310/50

(58) Field of Classification Search .................... 178/48, 178/205; 310/50
See application file for complete search history.

(56) References Cited

U.S. PATENT DOCUMENTS

| | | | | | |
|---|---|---|---|---|---|
| 3,736,992 | A | * | 6/1973 | Zander et al. | 173/48 |
| 3,762,881 | A | * | 10/1973 | Dunn | 428/548 |
| 3,785,443 | A | * | 1/1974 | Armbruster | 173/48 |
| 3,789,933 | A | * | 2/1974 | Jarecki | 173/48 |
| 3,809,168 | A | * | 5/1974 | Fromm | 173/13 |
| 3,835,715 | A | * | 9/1974 | Howell | 173/48 |
| 4,189,011 | A | * | 2/1980 | Eberle | 173/13 |
| 4,276,941 | A | | 7/1981 | Wanner et al. | |
| 4,303,131 | A | * | 12/1981 | Clark | 173/207 |
| 4,412,158 | A | * | 10/1983 | Jefferson et al. | 318/257 |
| 4,441,378 | A | * | 4/1984 | Ponczek | 74/414 |
| 4,567,950 | A | * | 2/1986 | Fushiya et al. | 173/48 |
| 5,056,607 | A | * | 10/1991 | Sanders | 173/48 |
| 5,343,961 | A | * | 9/1994 | Ichikawa | 173/48 |
| 5,628,374 | A | * | 5/1997 | Dibbern, Jr. | 173/48 |

FOREIGN PATENT DOCUMENTS

| | | | |
|---|---|---|---|
| JP | H04-124870 | A | 4/1992 |
| JP | H05-318214 | A | 12/1992 |
| JP | 7-7805 | U | 2/1995 |
| JP | 9-11157 | A | 1/1997 |
| JP | 2005-14145 | A | 1/2005 |
| JP | 2007-7821 | A | 1/2007 |

OTHER PUBLICATIONS

First Office Action from State Intellectual Property Office of P.R.C dated Jun. 9, 2010.
Japanese Office Action for the related Japanese Patent Application No. 2008-196093 dated Nov. 22, 2012.

* cited by examiner

*Primary Examiner* — Burton Mullins
(74) *Attorney, Agent, or Firm* — Kenealy Vaidya LLP

(57) ABSTRACT

According to an aspect of the present invention, there is provided a power tool including: a housing; a fan rotatably supported by the housing so as to generate an air flow; a wall portion supported by the housing; and a heat generation portion supported by the wall portion, wherein the wall portion has an exposing hole to expose a part of the heat generation portion so that the exposed part of the heat generation portion is positioned within the air flow.

3 Claims, 10 Drawing Sheets

POWER TOOL

CROSS-REFERENCE TO RELATED APPLICATIONS

This application is based upon and claims a priority from prior Japanese Patent Application No. 2008-196093 filed on Jul. 30, 2008, the entire contents of which are incorporated herein by reference.

BACKGROUND OF THE INVENTION

1. Field of the Invention

The present invention relates to a power tool.

2. Description of the Related Art

In order to form holes in concrete etc. efficiently, vibration drills, which form holes while generating vibration, is used. In such the vibration drill, a motor is rotated in a state where a ratchet and a gear each having a convex-concave step portion are abutted to each other to thereby generate the vibration from the ratchet. The ratchet is covered by an inner cover formed by metal such as aluminum in order to secure the durability with respect to the vibration generated by the ratchet and heat generated by the vibration (see JP-H04-124870-A and JP-H05-318214-A, for example).

However, in the vibration drills of the related art, since the inner cover is formed by metal such as aluminum, the material cost and the processing cost thereof are high.

SUMMARY OF THE INVENTION

One of objects of the invention is to provide a power tool which is cheap, rigid and heat-resistant.

According to an aspect of the present invention, there is provided a power tool including: a housing; a fan rotatably supported by the housing so as to generate an air flow; a wall portion supported by the housing; and a heat generation portion supported by the wall portion, wherein the wall portion has an exposing hole to expose a part of the heat generation portion so that the exposed part of the heat generation portion is positioned within the air flow.

According to another aspect of the present invention, there is provided a power tool including: a housing; a fan rotatably supported by the housing so as to generate an air flow; a wall portion supported by the housing; a heat generation portion supported by the wall portion; and a heat dissipation portion formed to extend from the heat generation portion toward an inside of the air flow.

According to still another aspect of the present invention, there is provided a power tool including: a housing; a fan rotatably supported by the housing so as to generate an air flow; a vibration generation portion that generates a vibration on a tip end tool; and a cover that is supported by the housing and receives a thrust transmitted from the tip end tool via the vibration generation portion, wherein the cover has an exposing hole to expose a part of the vibration generation portion so that the exposed part of the vibration generation portion is positioned within the air flow.

The cover may be formed of a resin.

DETAILED DESCRIPTION OF THE INVENTION

Figure 1:
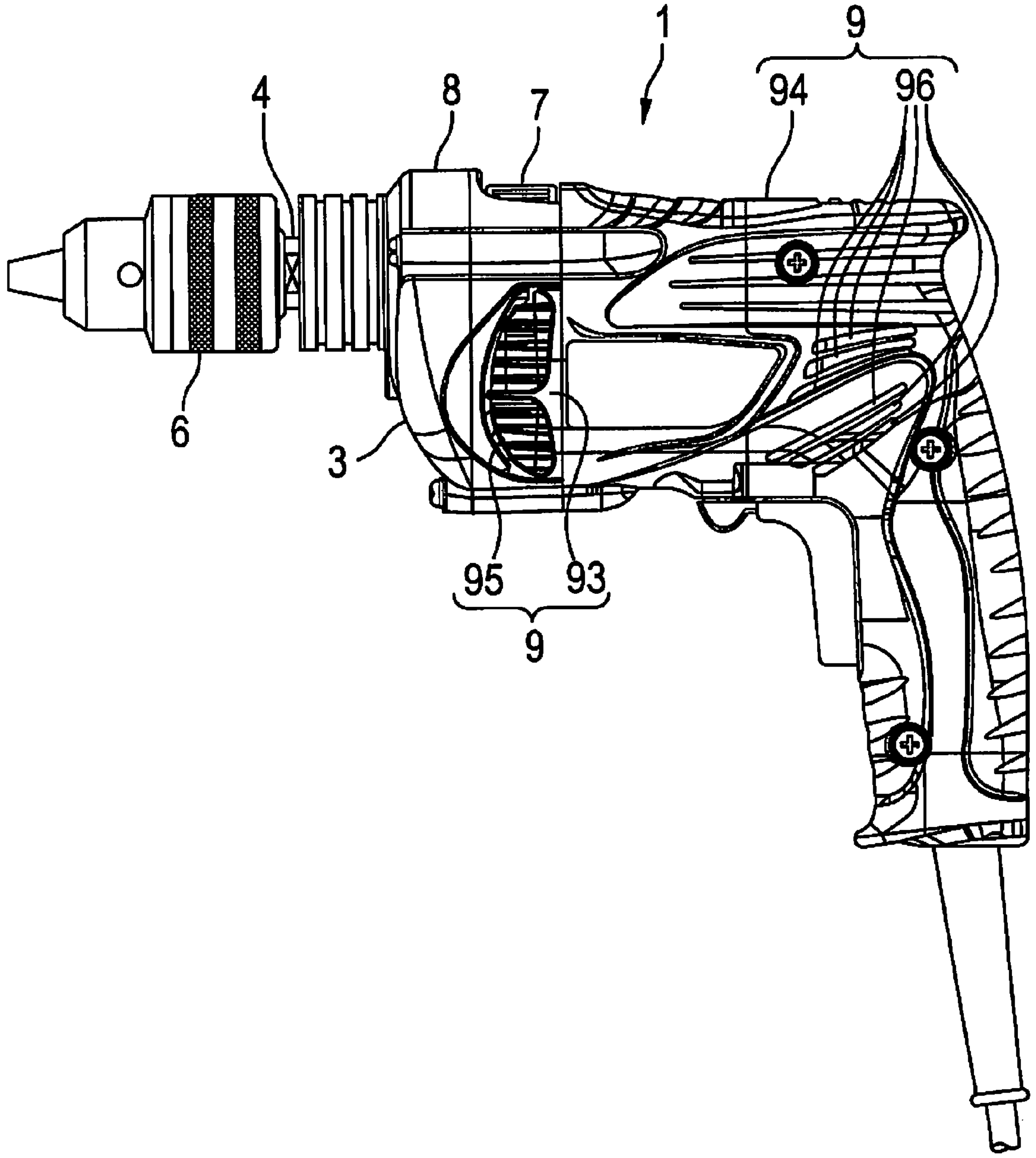
FIG. 1 is a schematic diagram of a vibration drill 1.
Figure 2:
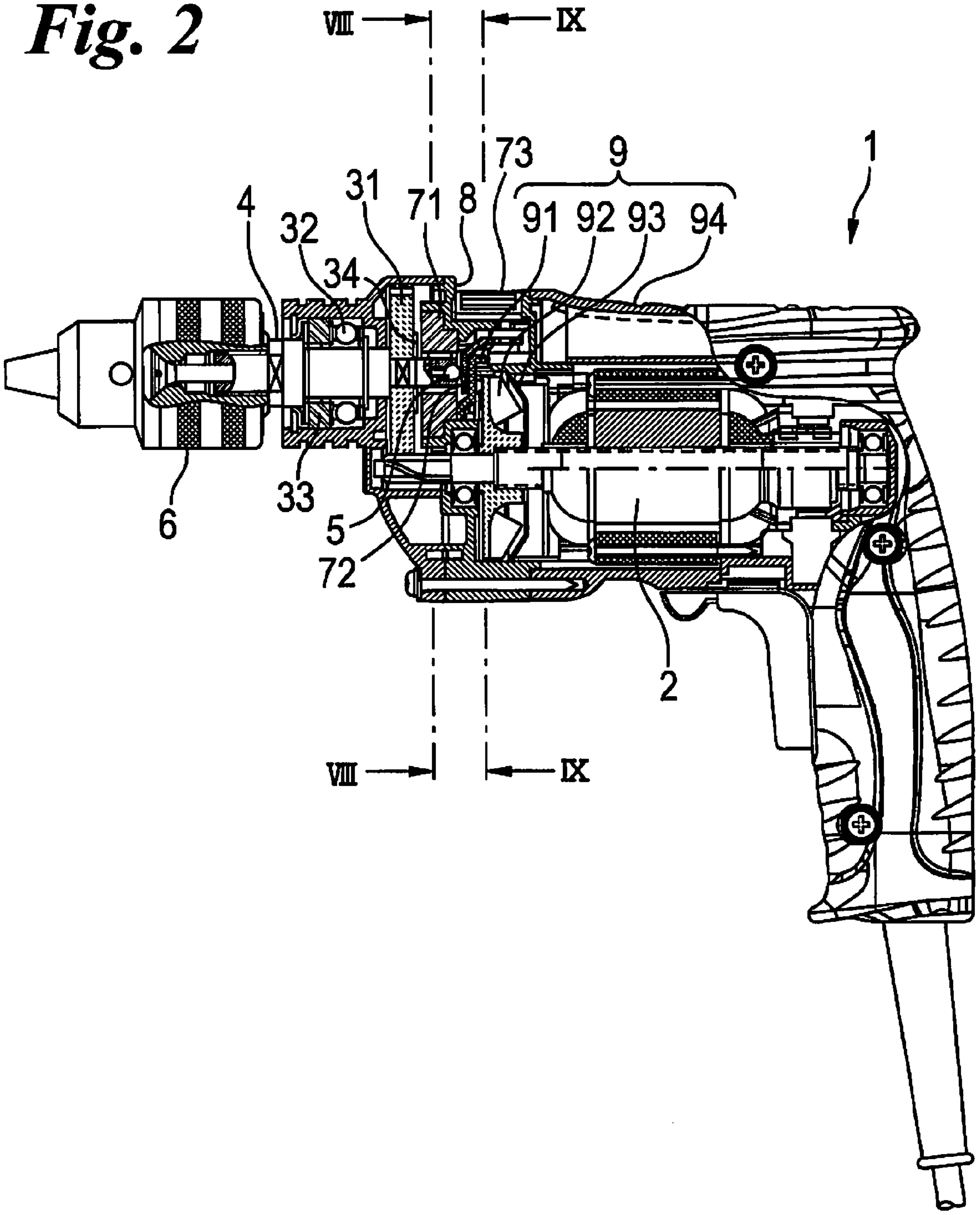
FIG. 2 is a sectional diagram showing the main portion of the vibration drill 1.

Hereinafter, an embodiment of the invention will be explained with reference to attached drawings. As the power tool according to the embodiment, where a vibration drill 1 is described. FIG. 1 is a schematic diagram of the vibration drill 1, and FIG. 2 is a sectional diagram showing the main portion of the vibration drill 1. Hereinafter, the left side, right side, upper side and lower side, inner side and nearer side of the drawing sheets in FIGS. 1 and 2 will be explained as forward direction, backward direction, upper direction, lower direction, left side and right side, respectively.

The vibration drill 1 includes a motor 2 for generating a rotation force, a gear portion 3 for reducing the speed of the rotation output from the motor 2, a spindle 4 for transmitting the rotation force from the gear portion 3 to a not-shown tip end tool, a ball 5 disposed between the gear portion 3 and the spindle 4, a chuck 6 for coupling the spindle 4 with the tip end tool, a vibration generation mechanism 7 for generating the vibration at the vibration drill 1, an inner cover 8 for holding the vibration generation mechanism 7, and a cooling mechanism 9.

The gear portion 3 includes a gear 31, a bearing 32 for pivotally supporting the spindle 4 so as to be movable in a thrust direction, a spring 33 for urging the spindle 4 in the thrust direction, and a convex-concave gear step portion 34 for abutting against a ratchet step portion 71A described later. The chuck 6 is fixed by left-hand screws in order to prevent the spindle 4 from loosing at the time of the reverse rotation. The vibration generation mechanism 7 includes a ratchet 7 for generating the vibration at the motor 2, a change plate 72 disposed at a position corresponding to the mode of the vibration drill 1, and a change lever 73 for allowing a user to move the position of the change plate 72.

Figure 3A:
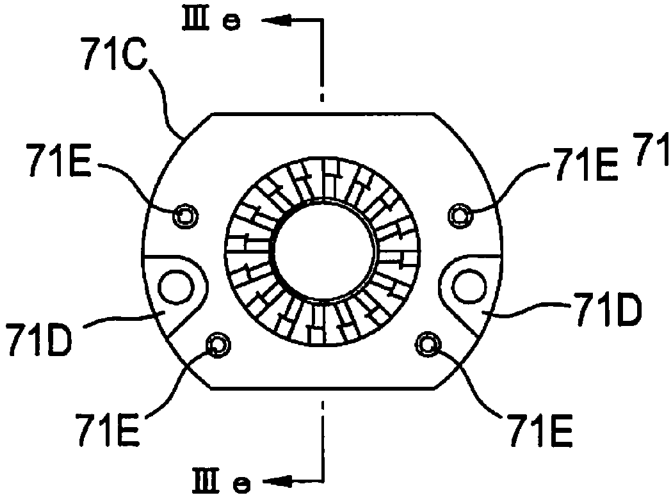
FIG. 3A is a front view of a ratchet 71.
Figure 3D:
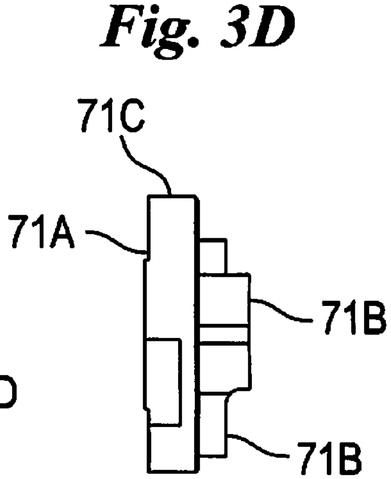
FIG. 3D is a side view of the ratchet 71.
Figure 3B:
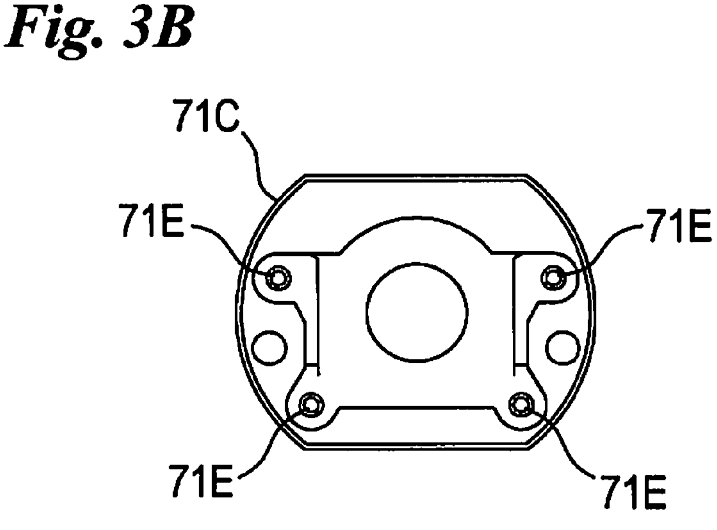
FIG. 3B is a rear view of the ratchet 71.
Figure 3E:
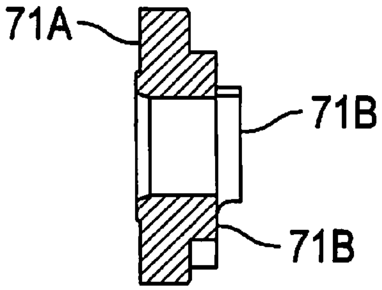
FIG. 3E is a sectional view cut along a line IIIe-IIIe in FIG. 3A.
Figure 3C:
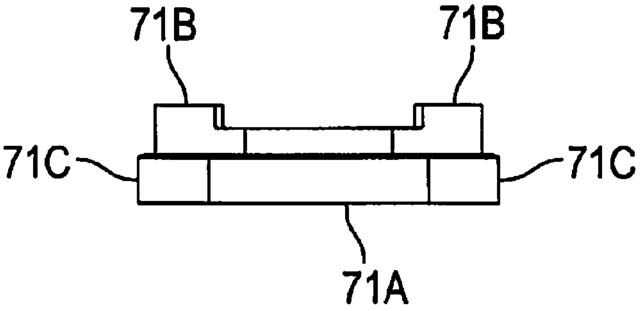
FIG. 3C is a top view of the ratchet 71.

The ratchet 71 will be explained by using FIGS. 3A to 3E. FIG. 3A is a front view of the ratchet 71, FIG. 3B is a rear view of the ratchet 71, FIG. 3C is a top view of the ratchet 71, FIG. 3D is a side view of the ratchet 71, and FIG. 3E is a sectional view cut along a line IIIe-IIIe in FIG. 3A. The convex-concave ratchet step portion 71A for abutting against the gear step portion 34 of the gear portion 3 is provided at the front surface of the ratchet 71, and a plurality of bush attachment surfaces 71B for attaching a bush 91 described later is provided at the rear surface of the ratchet 71. As shown in FIG. 3C, a space allowing the change plate 72 to slide in the left and right directions is formed between the left and right bush attachment surfaces 71B. Further, the ratchet 71 is provided with an outer periphery 71C to be fit in a fastened manner with the inner cover 8, screw sheets 71D for respectively receiving self tapping screws A for fixing with the inner cover 8, and screw holes 71E in which screws B are respectively inserted for fixing with the bushes 91. The ratchet 71 is functioning as a heat generation portion and a vibration generation portion.

Figure 5A:
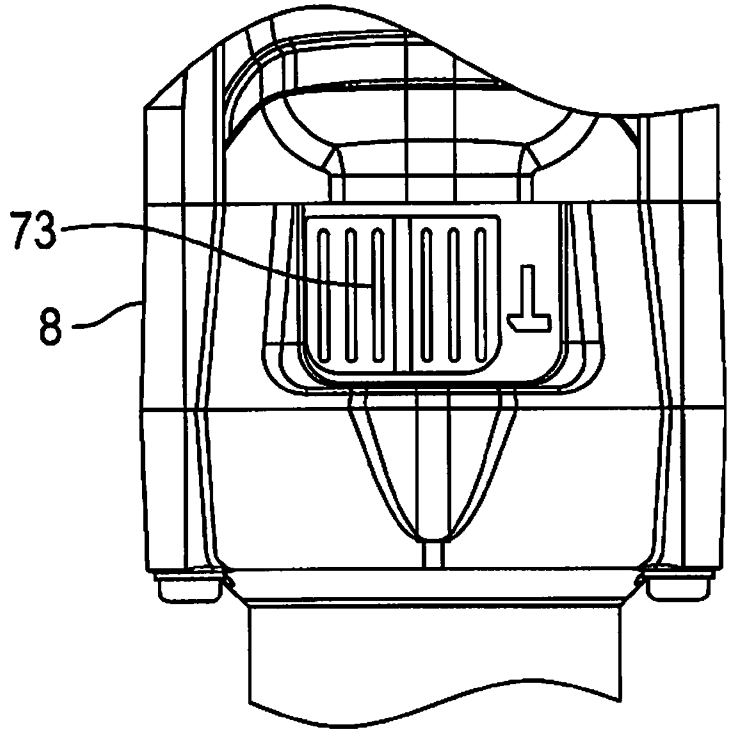
FIG. 5A is a diagram for explaining the position of a change lever 73 in a vibration mode.
Figure 5B:
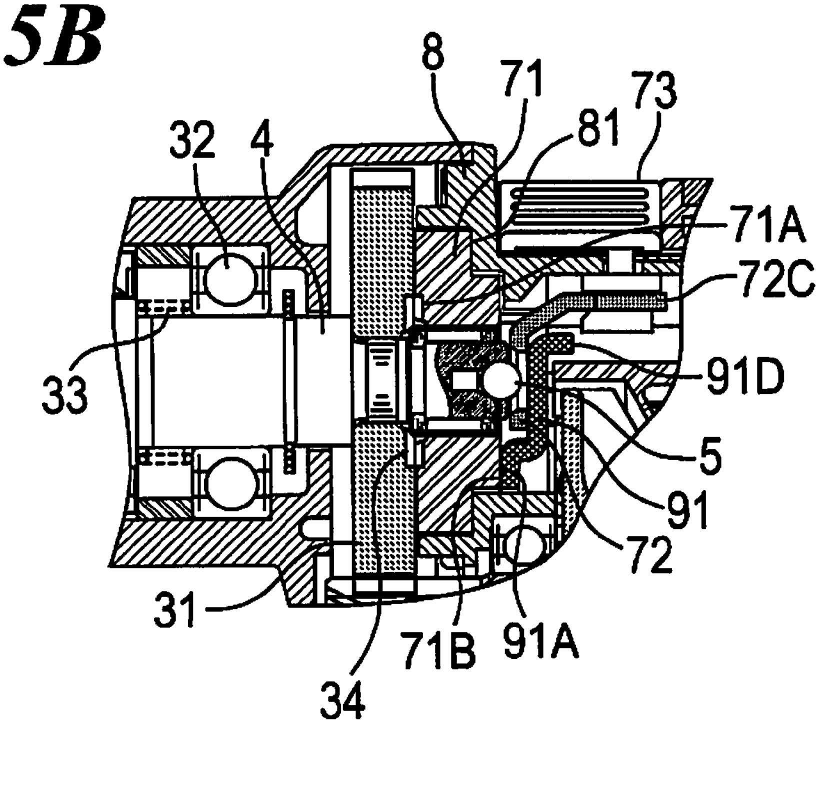
FIG. 5B is a diagram for explaining the position of a change plate 72 in the vibration mode.
Figure 6A:
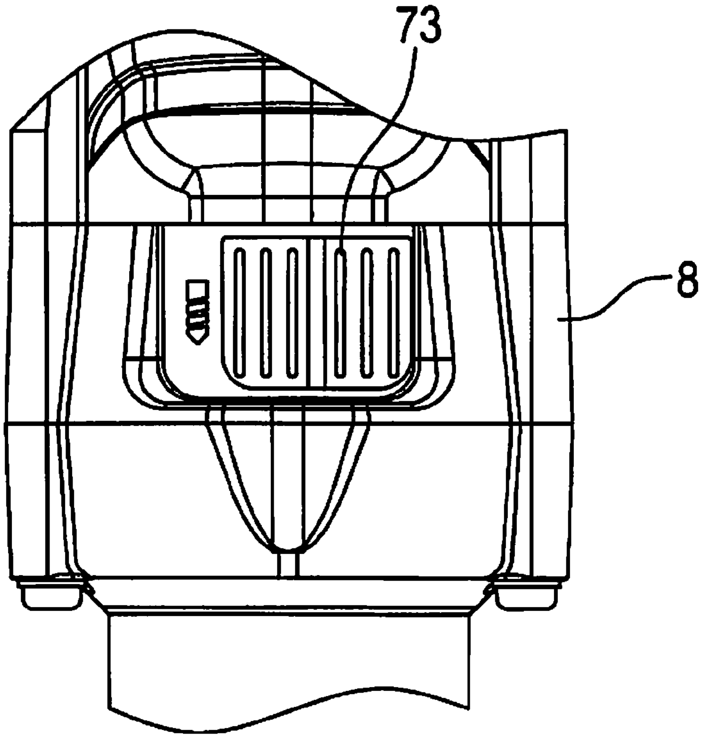
FIG. 6A is a diagram for explaining the position of the change lever 73 in a normal mode.

Next, the explanation will be made as to the change plate 72 and the change lever 73 by using FIG. 4A to FIG. 6B. FIG. 5A is a diagram for explaining the position of the change lever 73 in a vibration mode, and FIG. 5B is a diagram for explaining the position of the change plate 72 in the vibration mode. FIG. 6A is a diagram for explaining the position of the change lever 73 in a normal mode, and FIG. 6B is a diagram for explaining the position of the change plate 72 in the normal mode.

Figure 4A:
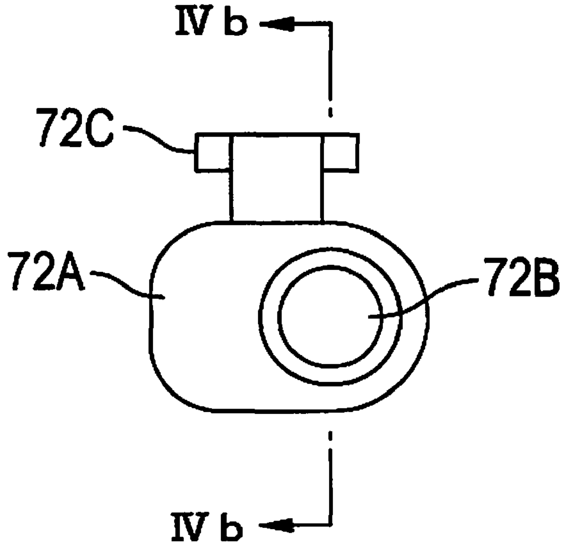
FIG. 4A is a plan view of a change plate 72.
Figure 4B:
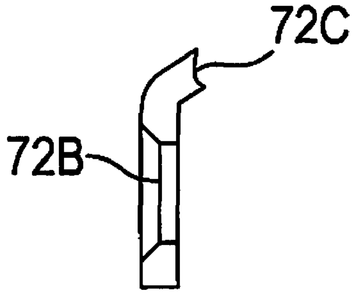
FIG. 4B is a sectional view cut along a line IVb-IVb in FIG. 4A.

As shown in FIGS. 4A and 4B, the change plate 72 is provided with a plane portion 72A, a hole portion 72B and a coupling portion 72C. The change lever 73 is coupled to the coupling portion 72C, and the change plate 72 slides in accordance with the movement of the change lever 73. When the tip end tool is pushed against a processing object member in a state that the change lever 73 locates at the position of the vibration mode shown in FIG. 5A, the ball 5 fits in the hole portion 72B of the change plate 72 as shown in FIG. 5B, whereby the gear step portion 34 abuts against the ratchet step portion 71A. When the motor 2 rotates in this state, the gear step portion 34 also rotates. Thus, a striking action arises between the gear step portion 34 and the ratchet step portion 71A in accordance with the rotation of the gear step portion 34 to thereby generate vibration. Due to this vibration, the vibration drill 1 can efficiently form holes concrete, mortar, stone etc.

Figure 6B:
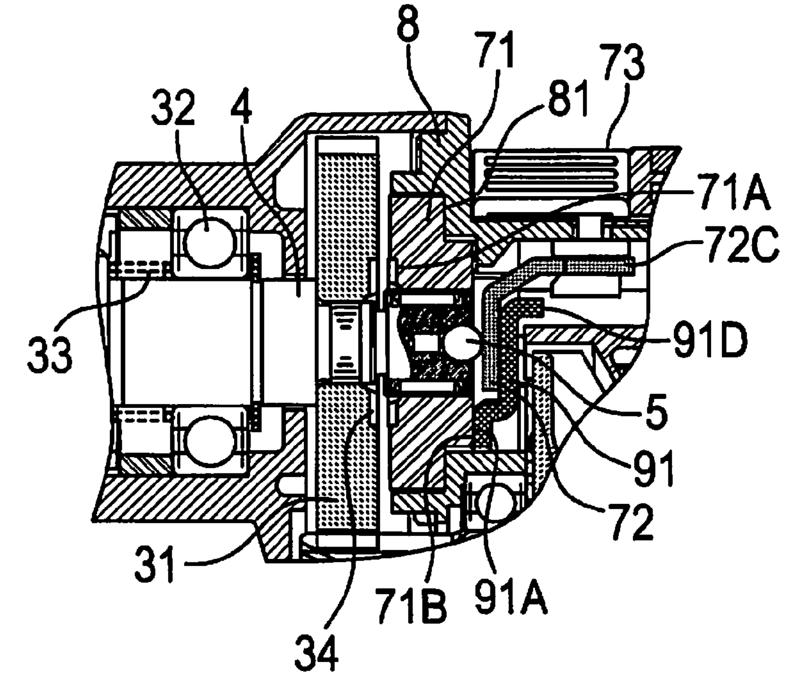
FIG. 6B is a diagram for explaining the position of the change plate 72 in the normal mode.

In contrast, when the tip end tool is pushed against the processing object member in a state that the change lever 73 locates at the position of the normal mode shown in FIG. 6A, the ball 5 abuts against the plane portion 72A of the change plate 72 as shown in FIG. 6B, whereby the gear step portion 34 does not contact with the ratchet step portion 71A. In this case, since the vibration is not generated even if the motor 2 rotates, the vibration drill 1 can efficiently form holes in steel, wood etc. like a normal drill.

Figure 7A:
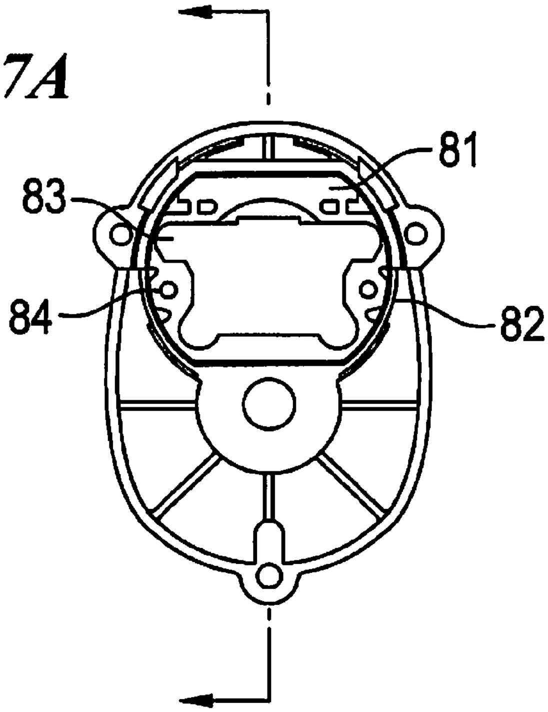
FIG. 7A is a front view of an inner cover 8.
Figure 7B:
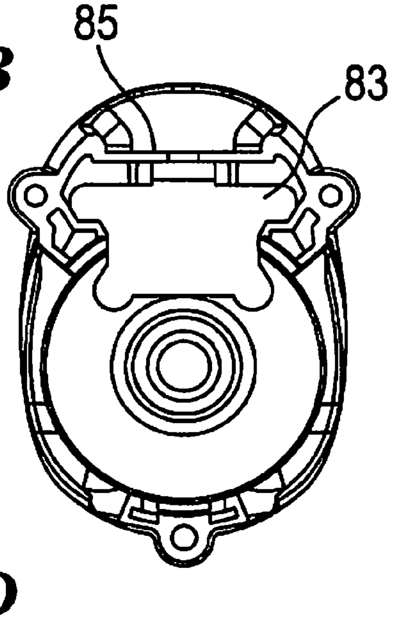
FIG. 7B is a rear view of the inner cover 8.
Figure 7D:
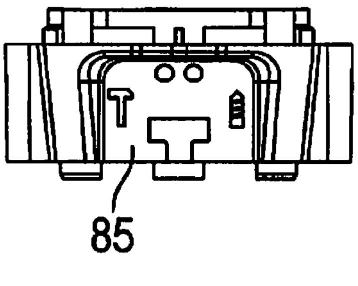
FIG. 7D is a top view of the inner cover 8.
Figure 7C:
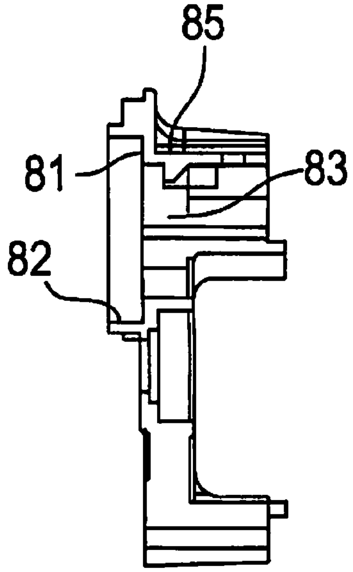
FIG. 7C is a sectional view cut along a line VIIa-VIIa in FIG. 7A.
Figure 7E:
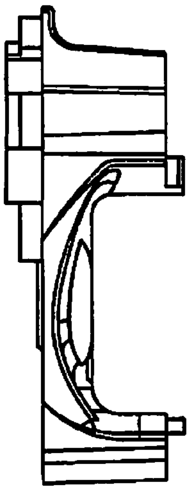
FIG. 7E is a side view of the inner cover 8.
Figure 8:
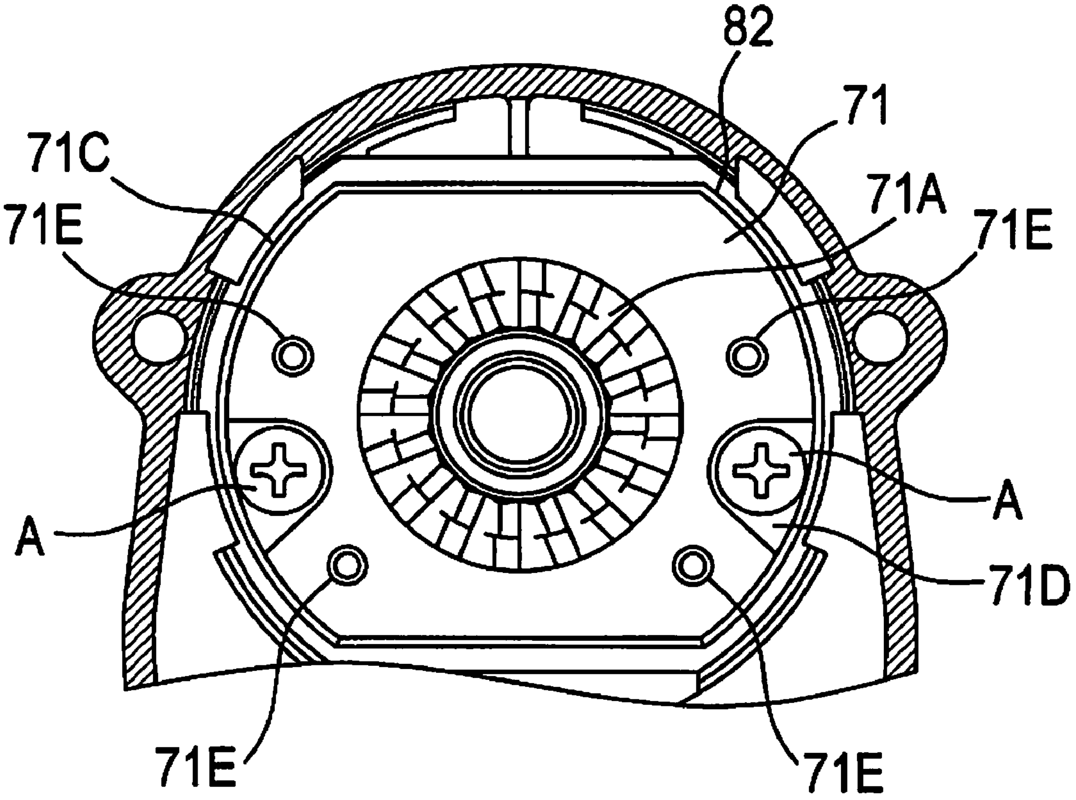
FIG. 8 is a sectional view cut along a line VIII-VIII in FIG. 2.

Next, the explanation will be made as to the inner cover 8 by using FIG. 7A to FIG. 9. FIG. 7A is a front view of the inner cover 8, FIG. 7B is a rear view of the inner cover 8, FIG. 7C is a sectional view cut along a line VIIa-VIIa in FIG. 7A, FIG. 7D is a top view of the inner cover 8, and FIG. 7E is a side view of the inner cover 8. FIG. 8 is a sectional view cut along a line VIII-VIII in FIG. 2, and FIG. 9 is a sectional view cut along a line IX-IX in FIG. 2.

The inner cover 8 is formed by resin. The inner cover 8 is provided with a seat surface 81 for supporting the ratchet 71 in the thrust direction, an inner periphery 82 to be fit in a fastened manner with the outer periphery 71C of the ratchet 71, an exposing hole portion 83 for exposing the rear end of the ratchet 71, screw holes 84 in which the self tapping screws A received by the screw sheets 71D of the ratchet 71 are respectively inserted, and a slide hole 85 for enabling the sliding operation of the change lever 73. The seat surface 81 is formed to have an area and a thickness sufficient for securing a sufficient rigidity for supporting a thrust and a torque transmitted to the ratchet 71 from the tip end tool. In this embodiment, the seat surface 81 has the thickness of 5 mm and the area of the seat surface 81 is set so as to be in proportional to the area of the exposing hole portion 83. The inner cover 8 corresponds to a wall portion and a cover of the invention.

Figure 9:
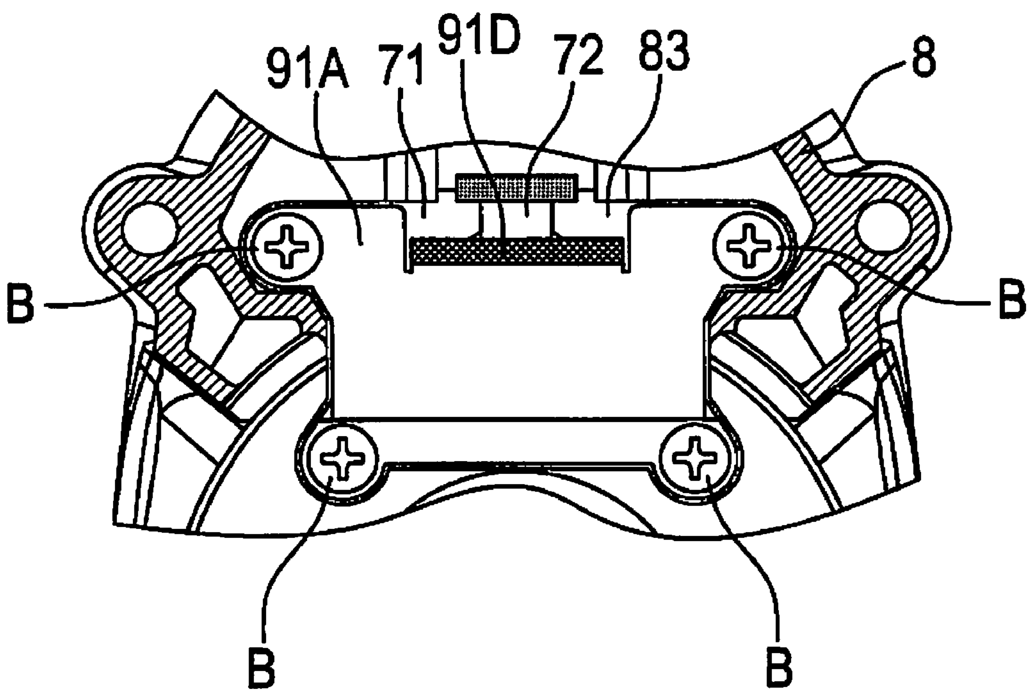
FIG. 9 is a sectional view cut along a line IX-IX in FIG. 2.

As shown in FIGS. 8 and 9, when the ratchet 71 is attached to the inner cover 8 thus configured, the rear end portion of the ratchet 71 is exposed from the exposing hole portion 83 of the inner cover 8. In this manner, according to the vibration drill 1 of the embodiment, since the rear end portion of the ratchet 71 for generating the vibration is exposed from the exposing hole portion 83 of the inner cover 8, the heat generated due to the vibration can be dissipated. The inner cover of the vibration drill of the related art is formed by metal having a thickness of about 2.5 mm in order to support a thrust and a torque transmitted to the ratchet from the tip end tool. In contrast, although the inner cover 8 of the vibration drill 1 according to the embodiment is formed by resin, since it is formed to have the thickness of 5 mm, the thrust transmitted to the ratchet 71 from the tip end tool can be securely supported. The inventors of the invention experimentally found that the inner cover 8 of the embodiment has improved rigidity as compared with the aluminum inner cover having the thickness of about 2.5 mm of the related art. Further, since the ratchet 71 and the inner cover 8 are fixed to each other by means of the self tapping screws A, these members are combined more firmly.

Next, the explanation will be made as to the cooling mechanism 9 by using FIGS. 1, 2, 10A and 10B. The cooling mechanism 9 includes a bush 91, a fan 92, a fan guide 93, a housing 94, an exhaust port 95 and a suction port 96. The inner cover 8 and the fan 92 are supported by the housing 94.

Figure 10A:
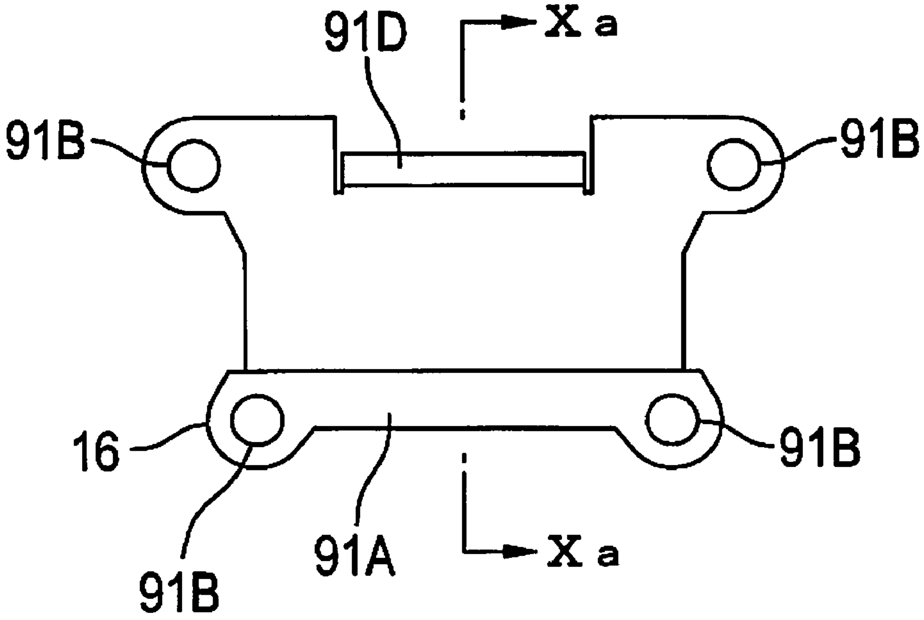
FIG. 10A is a front view of a bush 91.
Figure 10B:
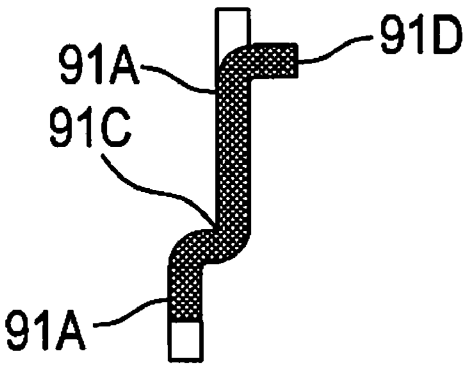
FIG. 10B is a sectional view cut along a line Xa-Xa in FIG. 10A.

FIG. 10A is a front view of the bush 91 and FIG. 10B is a sectional view cut along a line Xa-Xa in FIG. 10A. The bush 91 has rigidity with respect to the thrust and torque transmitted from the tip end tool and is formed by material with high thermal conductivity, for example, a sintered part such as a metal pressed part of steel. As shown in FIGS. 10A and 10B, the bush is provided with an attachment portion 91A attached to the bush attachment surfaces 71B of the ratchet 71 by means of the screws B, screw holes 91B for receiving the screws for fixing to the ratchet 71, a slide portion 91C for enabling the sliding operation of the change plate 72, and an extended portion 91D acting as a cooling fin.

An air flow is generated by the rotation of the fan 92, and flows toward the exhaust port 95 form the suction port 96 through an air passage formed by the fan guide 92 and the housing 94. In the vibration drill 1 according the embodiment, the rear end portion of the ratchet 71 exposed from the exposing hole portion 83 of the inner cover 8 is exposed in the air flow. Thus, the heat generated at the ratchet 71 in accordance with the vibration can be dissipated efficiently.

Further, since the bush 91 is attached to the rear end portion of the ratchet 71, the bush 91 is also exposed in the air flow. Since the bush 91 is formed by the metal press processing with high thermal conductivity, the heat generated at the ratchet 71 in accordance with the vibration can be dissipated more efficiently. Further, although the thrust and torque transmitted from the tip end tool to the ratchet 71 is finally applied to the bush, since the bush 91 is formed by the metal press processing, the bush has also durability with respect to the thrust and torque transmitted from the tip end tool.

Further, in this embodiment, the bush 91 is provided with the extended portion 91D in a manner of being bent from the attachment portion 91A and the extended portion 91D is exposed in the air flow. Since the extended portion 91D is also formed by the metal pressing process and has high thermal conductivity, the extended portion also acts as a cooling fin, so that the heat generated at the ratchet 71 in accordance with the vibration can be dissipated further efficiently. The size of the extended portion 91D is adjusted in accordance with a desired heat dissipation amount. Further, since the extended portion is bent from the attachment portion 91A, the entire rigidity of the bush is further improved and further the durability with respect to the thrust and torque transmitted from the tip end tool is also improved. The bush 91 and the extended portion 91D correspond to a heat dissipation member of the invention.

In this manner, according to the vibration drill 1 of the embodiment, since the fixing operation is performed by the seat surface 81 that is formed to have the area and thickness for securing the sufficient rigidity and the self tapping screws A, the cheap resin inner cover 8 can be employed without causing a problem relating to the rigidity even in the vibration mode. Further, according to the vibration drill 1 of the embodiment, since the rear end portion of the ratchet 71 exposed from the exposing hole portion 83 of the inner cover 8, the bush 91 fixed by the ratchet 71 and the screws B, and the extended portion 91D are exposed in the air flow, the heat generated at the ratchet 71 in accordance with the vibration can be dissipated efficiently. Thus, although resin is disadvantageous in the heat durability, it becomes possible to form the inner cover 8 by using resin.

The power tool according to the invention is not limited to the aforesaid embodiment and various modification may be made within a scope not departing from the gist of the invention. For example, the invention is applicable to the other kinds of power tools having a heat generation portion or a vibration generation portion as well as the vibration tool. A member which generates heat due to a rubbing or a striking is considered as the heat generation portion or the vibration generation.

According to the invention, a power tool which is cheap, rigid and heat-resistant can be provided.

What is claimed is:

1. A power tool comprising:

a motor;

a housing accommodating the motor;

a fan rotatably accommodated in a first space of the housing to generate an air flow;

a wall portion supported by the housing;

a first ratchet accommodated in the housing and supported by the wall portion, the first ratchet accommodated in a second space of the housing;

a spindle;

a gear step portion supported by the spindle and configured to abut against the first ratchet;

a chuck supported by the spindle; and a metal heat dissipation portion connected to the first ratchet, the metal heat dissipation portion extending toward an inside of the air flow, wherein the wall portion is formed of a resin; and wherein the first space of the housing communicates with the second space of the housing.

2. The power tool according to claim 1, wherein the chuck is disposed at a front side of the first ratchet, the first ratchet is disposed at a front side of the wall portion, the fan is disposed at a rear side of the wall portion, and the wall portion has an exposing hole to expose a rear end of the first ratchet.

3. The power tool according to claim 1, wherein a ball is connected to the spindle, and the heat dissipation portion is configured to guide a change plate connectable to the ball.

* * * * *